US012508857B2

(12) United States Patent
Diamond et al.

(10) Patent No.: US 12,508,857 B2
(45) Date of Patent: Dec. 30, 2025

(54) COORDINATED CONTROL OF VEHICLE AND TRAILER ELECTRIC MACHINES

(71) Applicant: FORD GLOBAL TECHNOLOGIES, LLC, Dearborn, MI (US)

(72) Inventors: Brendan F. Diamond, Grosse Pointe, MI (US); Keith Weston, Canton, MI (US); Andrew Denis Lewandowski, Sterling Heights, MI (US); Shehan Haputhanthri, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 762 days.

(21) Appl. No.: 17/578,652

(22) Filed: Jan. 19, 2022

(65) Prior Publication Data

US 2023/0226866 A1  Jul. 20, 2023

(51) Int. Cl.
*B60D 1/62* (2006.01)
*B60L 58/12* (2019.01)
*B60L 58/22* (2019.01)
*B60L 58/25* (2019.01)

(52) U.S. Cl.
CPC .............. *B60D 1/62* (2013.01); *B60L 58/12* (2019.02); *B60L 58/22* (2019.02); *B60L 58/25* (2019.02); *B60L 2200/28* (2013.01)

(58) Field of Classification Search
CPC . B60D 1/62; B60L 58/12; B60L 58/22; B60L 58/25; B60L 2200/28
See application file for complete search history.

(56) References Cited

U.S. PATENT DOCUMENTS

| 6,390,215 | B1* | 5/2002 | Kodama | B60L 50/62 180/2.1 |
| 7,338,335 | B1 | 3/2008 | Messano | |
| 8,700,284 | B2 | 4/2014 | Wojtkowicz et al. | |
| 9,857,255 | B2* | 1/2018 | Hagan | B60L 58/20 |
| 10,414,288 | B2* | 9/2019 | Mangette | B60L 3/08 |
| 11,951,790 | B2* | 4/2024 | Delizo | B60G 17/0165 |
| 2007/0021265 | A1* | 1/2007 | Smithberger | F02D 41/182 477/3 |
| 2008/0295595 | A1* | 12/2008 | Tacklind | A61G 5/14 73/462 |
| 2012/0130573 | A1* | 5/2012 | Wu | B60T 8/17555 701/22 |
| 2015/0105213 | A1* | 4/2015 | Wright | B60W 20/40 180/65.265 |
| 2015/0112522 | A1* | 4/2015 | Liang | B60W 10/08 180/65.265 |

(Continued)

FOREIGN PATENT DOCUMENTS

| KR | 102478604 B1 * | 12/2022 | ............ B63B 25/28 |
| WO | WO-2017142536 A1 * | 8/2017 | ......... G06Q 30/0645 |
| WO | WO-2020018163 A9 * | 3/2020 | ............... B60L 7/26 |

*Primary Examiner* — Rachid Bendidi
*Assistant Examiner* — Nada Mahyoob Alqaderi
(74) *Attorney, Agent, or Firm* — David B. Kelley; Brooks Kushman P.C.

(57) ABSTRACT

A controller commands an electric machine of a vehicle to produce propulsive torque with energy from a traction battery of the vehicle and, at a same time, commands an electric machine of a trailer coupled with the vehicle to produce regenerative torque such that a speed of the vehicle does not change.

12 Claims, 4 Drawing Sheets

(56) References Cited

U.S. PATENT DOCUMENTS

| | | | | |
|---|---|---|---|---|
| 2015/0204741 | A1* | 7/2015 | Hagan | B60L 53/14 |
| | | | | 180/65.21 |
| 2015/0251654 | A1* | 9/2015 | Wright | F02D 29/02 |
| | | | | 903/905 |
| 2016/0362013 | A1* | 12/2016 | Gibeau | B60L 58/13 |
| 2018/0037219 | A1* | 2/2018 | Johri | B60W 30/18072 |
| 2018/0080852 | A1* | 3/2018 | Hagan, Jr. | B60D 1/155 |
| 2018/0093572 | A1* | 4/2018 | Hall | B60T 8/245 |
| 2018/0105060 | A1* | 4/2018 | McQuillen | B60L 58/21 |
| 2018/0154787 | A1* | 6/2018 | Chen | B60W 50/082 |
| 2019/0009760 | A1* | 1/2019 | Zenner | B60T 8/323 |
| 2019/0126759 | A1* | 5/2019 | Miller | B60L 7/18 |
| 2020/0148191 | A1* | 5/2020 | Rawsky | B60W 20/30 |
| 2020/0361469 | A1* | 11/2020 | McCollough | B60W 30/18127 |
| 2020/0391597 | A1* | 12/2020 | Zhao | G08G 1/096783 |
| 2021/0053552 | A1* | 2/2021 | Szczepaniak | B60W 10/18 |
| 2021/0215493 | A1* | 7/2021 | Kapadia | G01C 21/3697 |
| 2021/0370779 | A1* | 12/2021 | Ford | B60L 15/06 |
| 2022/0041069 | A1* | 2/2022 | Layfield | B60L 7/10 |
| 2022/0169252 | A1* | 6/2022 | Yhr | B60L 58/15 |
| 2022/0194360 | A1* | 6/2022 | Weston | B60W 30/02 |
| 2022/0289038 | A1* | 9/2022 | Yokoo | B60W 50/085 |
| 2022/0314809 | A1* | 10/2022 | Yokoo | B60L 58/18 |
| 2023/0104277 | A1* | 4/2023 | Christen | B60W 20/10 |
| | | | | 701/22 |

* cited by examiner

COORDINATED CONTROL OF VEHICLE AND TRAILER ELECTRIC MACHINES

TECHNICAL FIELD

The present disclosure relates to a system and method for operating a trailer electric vehicle.

BACKGROUND

Electric vehicles are propelled by electric energy stored in a vehicle battery having limited storage capability. When towing a trailer, the driving range of the electric vehicle may decrease due to the extra weight. In addition, the weight of the trailer may create challenges for the thermal management of the powertrain.

SUMMARY

A vehicle includes an electric machine, a traction battery, and a controller that commands the electric machine to produce propulsive torque with energy from the traction battery and, at a same time, commands an electric machine of a trailer coupled with the vehicle to produce regenerative torque such that a speed of the vehicle does not change.

A vehicle, mechanically coupled to a trailer having a trailer computer and a trailer battery, includes a vehicle motor, a vehicle battery that supplies and receives electric charge from the vehicle motor, and a controller. The controller is in communication with the trailer computer and commands a transfer of electric charge between the trailer battery and the vehicle battery based on data about a route to be travelled by the vehicle.

A method includes, responsive to a state of charge of a traction battery of a vehicle being less than a state of charge of a battery of a trailer coupled to the vehicle, commanding an electric machine of the trailer to provide propulsive torque with energy from the battery and commanding an electric machine of the vehicle to provide regenerative torque such that a speed of the vehicle remains same.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
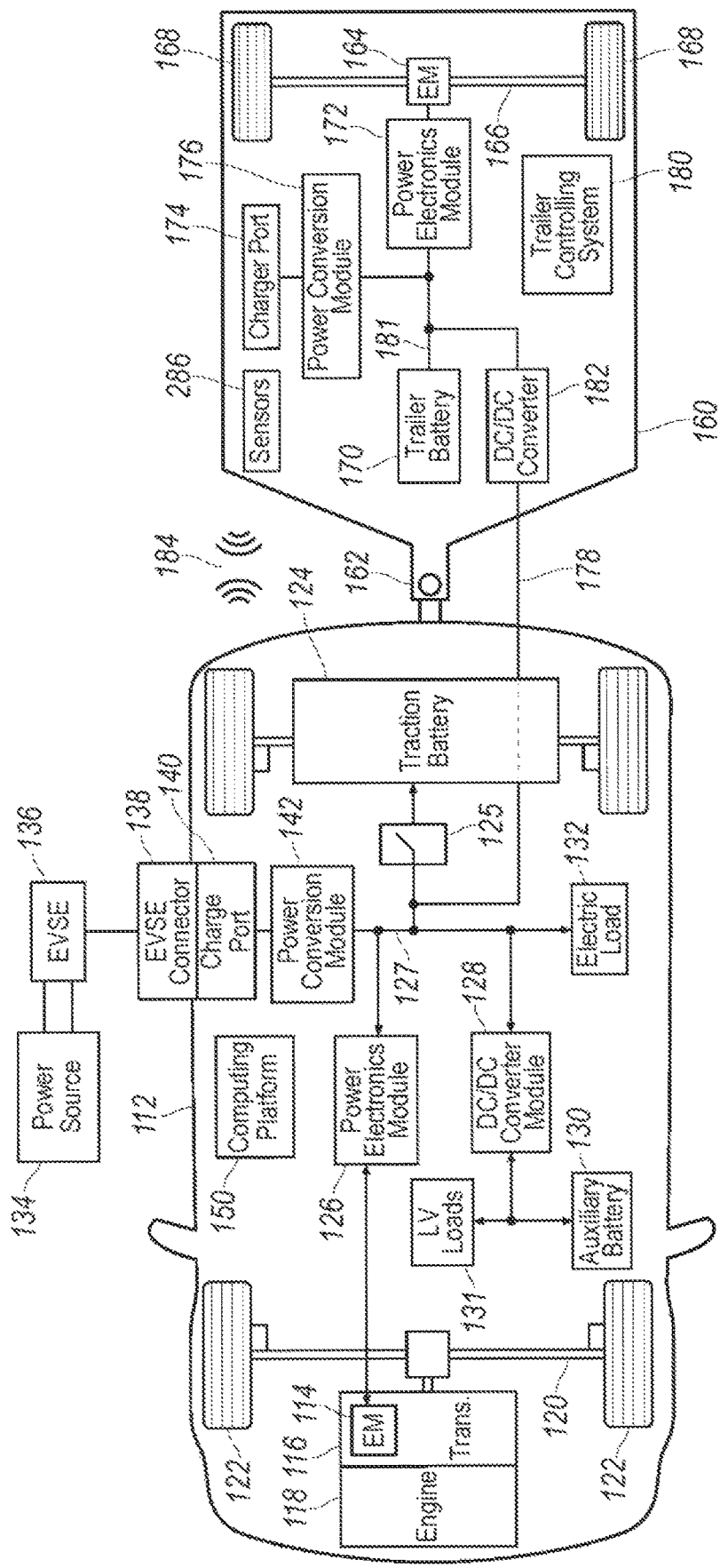
FIG. 1 is a diagram of an electrified vehicle and an electrified trailer illustrating drivetrain and energy storage components including an electric machine.

FIG. 1 depicts an electrified vehicle 112 that may be referred to as a plug-in hybrid-electric vehicle (PHEV), a battery electric vehicle (BEV), a mild hybrid-electric vehicle (MHEV), and/or full hybrid electric vehicle (FHEV). The plug-in hybrid-electric vehicle 112 may include one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and braking capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions.

A traction battery or battery pack 124 may store energy that can be used by the electric machines 114. The vehicle battery pack 124 may provide a high voltage direct current (DC) output. The traction battery 124 may be electrically coupled to one or more power electronics modules 126 (such as a traction inverter). One or more contactors 125 may isolate the traction battery 124 from other components via a high-voltage bus 127 when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) (not shown) electrically coupled between the traction battery 124 and the power electronics module 126. The VVC may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems having one or more low-voltage loads 131 may be electrically coupled to the auxiliary battery 130. One or more electrical loads 132 may be coupled to the high-voltage bus 127. The electrical loads 132 may have an associated controller that operates and controls the electrical loads 146 when appropriate. Examples of electrical loads 132 may be a fan, an electric heating element, and/or an air-conditioning compressor.

The electrified vehicle 112 may be configured to recharge the traction battery 124 from an external power source 134. The external power source 134 may be a connection to an electrical outlet. The external power source 134 may be electrically coupled to a charger or electric vehicle supply equipment (EVSE) 136. The external power source 134 may be an electrical power distribution network or grid as provided by an electric utility company. The EVSE 136 may provide circuitry and controls to regulate and manage the transfer of energy between the power source 134 and the vehicle 112. The external power source 134 may provide DC or AC electric power to the EVSE 136. The EVSE 136 may have a charge connector 138 for plugging into a charge port 140 of the vehicle 112. The charge port 140 may be any type of port configured to transfer power from the EVSE 136 to the vehicle 112. The charge port 140 may be electrically coupled to a charger or on-board power conversion module 142. The power conversion module 142 may condition the power supplied from the EVSE 136 to provide the proper voltage and current levels to the traction battery 124. The power conversion module 142 may interface with the EVSE 136 to coordinate the delivery of power to the vehicle 112. The EVSE connector 138 may have pins that mate with corresponding recesses of the charge port 140. Alternatively, various components described as being electrically coupled or connected may transfer power using a wireless inductive coupling.

The vehicle 112 may be further provided with a computing platform 150 configured to control and coordinative various operations of the vehicle 112 (to be described in detail below).

The vehicle 112 may be physically coupled to a trailer 160 via a trailer coupler 162 (e.g. a trailer hitch). The trailer 160 may be provided with energy storage and self-propelling capabilities via various components associated with the trailer 160. For instance, the trailer 160 may be provided with one or more electric machines 164 mechanically coupled to the trailer wheels 168 via one or more drive shafts 166. In some examples, a trailer transmission (not shown) may be provided between the electric machines 164 and the drive shaft 166 and configured to facilitate the drive transmissions therebetween. The electric machines 164 may be capable of operating as a motor or a generator. The electric machines 164 may provide propulsion and braking capability when the trailer is in operation. The electric machines 164 may also act as generators and when the trailer is braking. The trailer 160 may be further provided with a trailer traction battery 170 configured to store energy that can be used by the electric machines 164. The trailer battery 170 may provide a high voltage direct current (DC) output. The trailer battery 170 may be electrically coupled to one or more power electronics module 172 (such as an inverter). The power electronics module 172 is also electrically coupled to the electric machines 164 and provides the ability to bi-directionally transfer energy between the trailer battery 170 and the electric machines 164. For example, a traction battery 170 may provide a DC voltage while the electric machines 164 may operate with a three-phase alternating current (AC) to function. The power electronics module 172 may convert the DC voltage to a three-phase AC current to operate the electric machines 164. In a regenerative mode, the power electronics module 172 may convert the three-phase AC current from the electric machines 164 acting as generators to the DC voltage compatible with the trailer battery 170.

The trailer 160 may be configured to recharge the trailer battery 170 from the external power source 134 via the EVSE 136 through a charge port 174. The charge port 174 may be electrically coupled to a charger or on-board power conversion module 176 configured to condition the power supplied from the EVSE 136 to provide the proper voltage and current levels to the trailer battery 170. Operations of the trailer 160 may be controlled and coordinated via a trailer controlling system 180. (To be discussed in detail below.) A high-voltage bus 181 of the trailer 160 may be further electrically connected to the high-voltage bus 127 of the vehicle 112 via a cable 178. The cable 178 may be integrated with one of the vehicle 112 and/or the trailer 160 and disconnect/connect to the other to facilitate the power transaction between the traction battery 124 and the trailer battery 170. In case that the trailer battery 170 and the traction battery 124 have different voltages, a DC/DC converter 182 may be provided to facilitate the voltage conversion. It is noted that although the DC/DC converter is illustrated on the trailer side with reference to FIG. 1, the present invention is not limited thereto and the DC/DC converter may be provided on the vehicle side in other examples. The cable 178 may be further provided with data communication capabilities which enables the computing platform 150 of the vehicle 112 to communicate with the trailer controller system 180 via a wired connection. Additionally or alternatively, the computing platform 150 and the trailer controlling system 180 may be further configured to communicate with each other via a wireless connection 184 to enable various operations.

Figure 2:
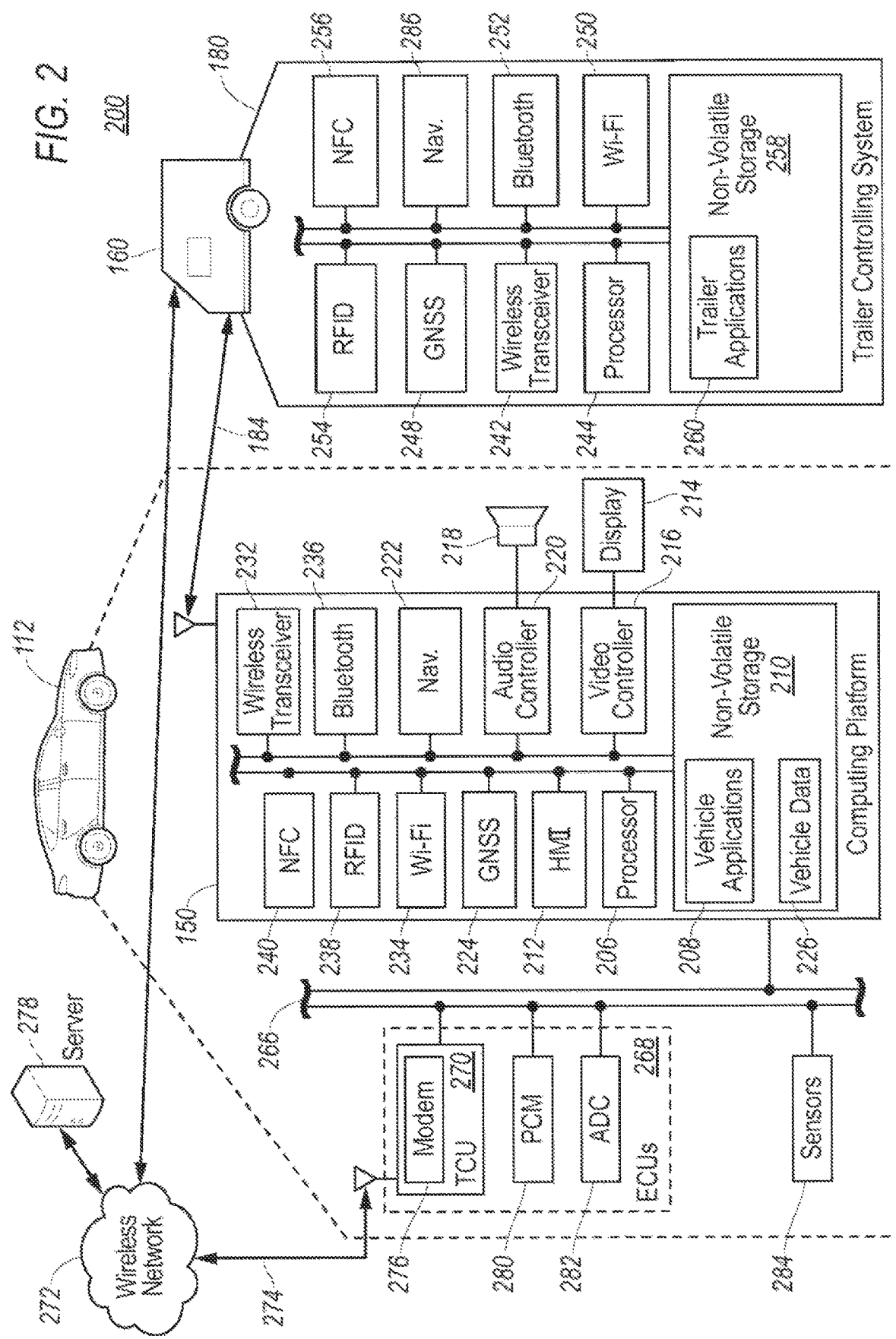
FIG. 2 is an example block topology of a vehicle system.

Referring to FIG. 2, an example block topology of a vehicle system 200 of one embodiment of the present disclosure is illustrated. As illustrated in FIG. 2, the computing platform 150 may include one or more processors 206 configured to perform instructions, commands, and other routines in support of the processes described herein. For instance, the computing platform 150 may be configured to execute instructions of vehicle applications 208 to provide features such as navigation, battery controls, and wireless communications. Such instructions and other data may be maintained in a non-volatile manner using a variety of types of computer-readable storage medium 210. The computer-readable medium 210 (also referred to as a processor-readable medium or storage) includes any non-transitory medium (e.g., tangible medium) that participates in providing instructions or other data that may be read by the processor 206 of the computing platform 150. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and SQL.

The computing platform 150 may be provided with various features allowing the vehicle occupants/users to interface with the computing platform 150. For example, the computing platform 150 may receive input from HMI controls 212 configured to provide for occupant interaction with the vehicle 112. As an example, the computing platform 150 may interface with one or more buttons, switches, knobs, or other HMI controls configured to invoke functions on the computing platform 150 (e.g., steering wheel audio buttons, a push-to-talk button, instrument panel controls, etc.).

The computing platform 150 may also drive or otherwise communicate with one or more displays 214 configured to provide visual output to vehicle occupants by way of a video controller 216. In some cases, the display 214 may be a touch screen further configured to receive user touch input via the video controller 216, while in other cases the display 214 may be a display only, without touch input capabilities. The computing platform 150 may also drive or otherwise communicate with one or more speakers 218 configured to provide audio output and input to vehicle occupants by way of an audio controller 220.

The computing platform 150 may also be provided with navigation and route planning features through a navigation controller 222 configured to calculate navigation routes responsive to user input via, for example, the HMI controls 212, and output planned routes and instructions via the speaker 218 and the display 214. Location data that is needed for navigation may be collected from a global navigation satellite system (GNSS) controller 224 configured to communicate with multiple satellites and calculate the location of the vehicle 112. The GNSS controller 224 may be configured to support various current and/or future global or regional location systems such as global positioning system (GPS), Galileo, Beidou, Global Navigation Satellite System (GLONASS) and the like. Map data used for route planning may be stored in the storage 210 as a part of the vehicle data 226. Navigation software may be stored in the storage 210 as one the vehicle applications 208.

As discussed above, the computing platform 150 may be configured to wirelessly communicate with the trailer controlling system 180 via the wireless connection 184 and/or a wired connection 162. A wireless transceiver 232 may be in communication with a Wi-Fi controller 234, a Bluetooth controller 236, a radio-frequency identification (RFID) controller 238, a near-field communication (NFC) controller 240, and other controllers such as a Zigbee transceiver, an IrDA transceiver, an ultra-wide band (UWB) controller (not shown), and be configured to communicate with a compatible wireless transceiver 242 of the trailer controlling system 180.

The trailer controlling system 180 may be provided with a processor 244 configured to perform instructions, commands, and other routines in support of the processes such as wireless communication, and trailer powertrain control or the like. For instance, the trailer controlling system 180 may be provided with a GNSS controller 248. The trailer controlling system 180 may be provided with the wireless transceiver 242 in communication with a Wi-Fi controller 250, a Bluetooth controller 252, a RFID controller 254, an NFC controller 256, and other controllers (not shown), configured to communicate with the wireless transceiver 232 of the computing platform 150. The trailer controlling system 180 may be further provided with a non-volatile storage 258 to store various trailer application 260.

The computing platform 150 may be further configured to communicate with various components of the vehicle 112 via one or more in-vehicle networks 266. The in-vehicle network 266 may include, but is not limited to, one or more of a controller area network (CAN), an Ethernet network, and a media-oriented system transport (MOST), as some examples. Furthermore, the in-vehicle network 266, or portions of the in-vehicle network 266, may be a wireless network accomplished via Bluetooth low-energy (BLE), Wi-Fi, UWB, or the like.

The computing platform 150 may be configured to communicate with various electronic control units (ECUs) 268 of the vehicle 112 configured to perform various operations via the in-vehicle network 266. The computing platform 150 may be configured to communicate with a TCU 270 configured to control telecommunication between vehicle 112 and a wireless network 272 through a wireless connection 274 using a modem 276. The wireless connection 274 may be in the form of various communication networks, for example, a cellular network. Through the wireless network 272, the vehicle may access one or more servers 278 to access various content for various purposes. It is noted that the terms wireless network and server are used as general terms in the present disclosure and may include any computing network involving carriers, router, computers, controllers, circuitry or the like configured to store data and perform data processing functions and facilitate communication between various entities. The ECUs 268 may include a powertrain control module (PCM) 280 configured to monitor and operate the power train of the vehicle 112. In the present example, the PCM 280 may be further configured to control and coordinate the powertrain operations of both the vehicle 112 and the trailer 160 individually or in combination with the computing platform 150. The ECUs 268 may further include an autonomous driving controller (ADC) 282 configured to control an autonomous driving feature of the vehicle 112. Driving instructions may be received remotely from the server 278. The ADC 282 may be configured to perform the autonomous driving features using the driving instructions combined with navigation instructions from the navigation controller 222. The ADC 282 may be configured to adjust the driving instructions adapted for various driving conditions. For instance, the ADC 282 may adjust the driving instructions depending on whether the trailer 160 is connected to the vehicle 112. If the trailer 160 is connected, the ADC 282 may avoid instructions involving heavy acceleration/brake or tight turn or the like. The ECUs 268 may be provided with or connected to one or more sensors 284 providing signals related to the operation of the specific ECU 268. For instance, the sensors 284 may include an ambient temperature sensor configured to measure the ambient temperature of the vehicle 112. The sensors 284 may further include one or more engine/coolant temperature sensors configured to measure the temperature of the engine/coolant and provide such data to the PCM 280. The sensors 284 may further include one or more battery temperature sensors configured to measure the temperature of one or more cells of the traction battery 124. The sensors 284 may further include one or more weight sensors to measure the weight/load of the vehicle 112. In addition, the trailer 160 may be provided with various trailer sensors 286 configured to provide sensor data to the trailer controller system 180 as well as to the computing platform 150. For instance, the trailer sensors 286 may include a temperature sensor (not shown) to measure the temperature of one or more cells of the trailer battery 170. The trailer temperature may be sent to the computing platform 150 and/or the PCM 280 to facilitate the powertrain control and coordination between the vehicle 112 and the trailer 160. The trailer sensors 286 may further include one or more weight sensors configured to measure the weight/load of the trailer 160.

Figure 3:
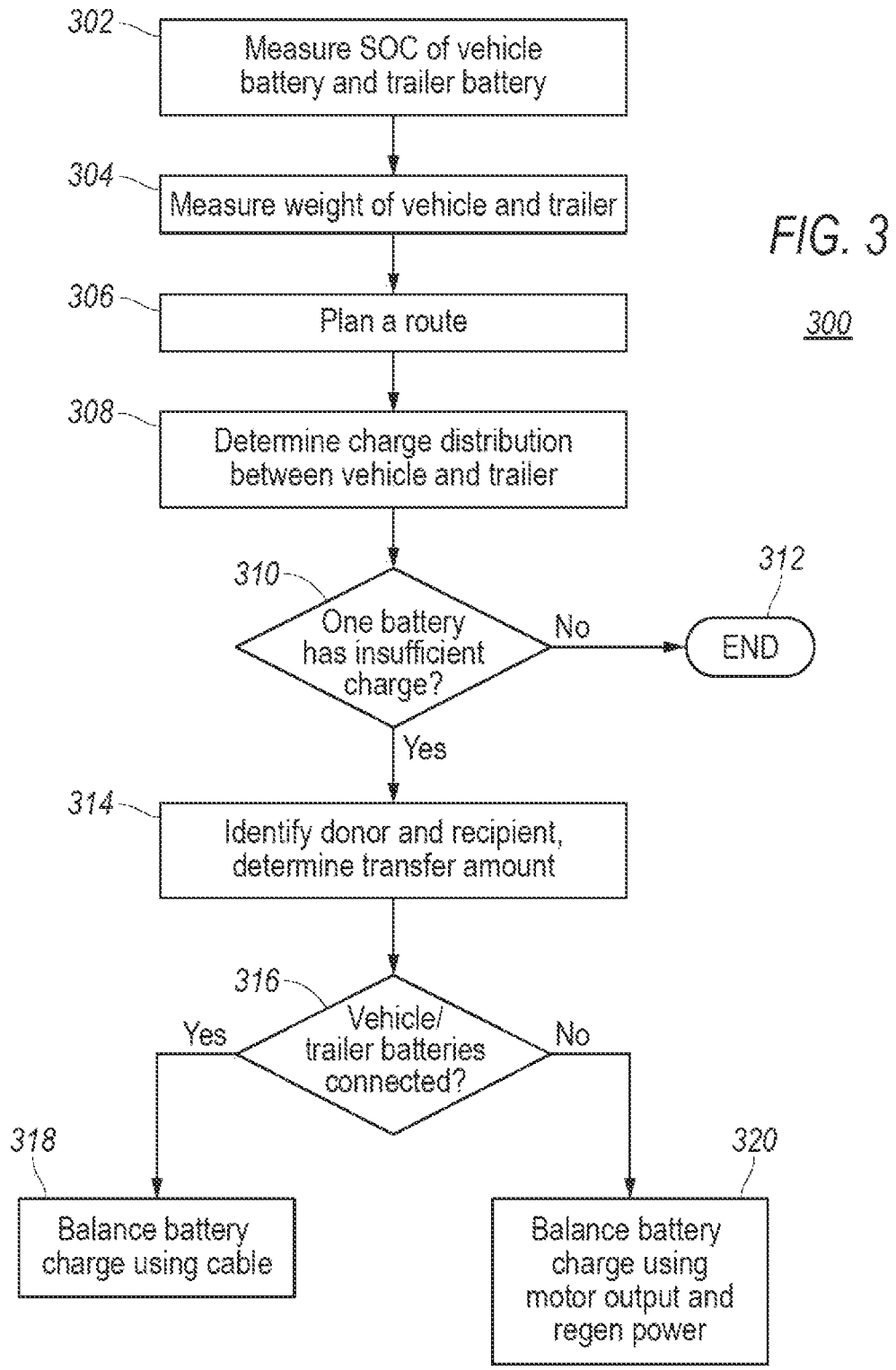
FIG. 3 is a flow diagram of a process for balancing battery charge.

Referring to FIG. 3, an example flow diagram of a process 300 for balancing charges between the traction battery 124 and the trailer battery 170 is illustrated. One of the purposes of the battery balancing is to prevent battery and/or motor overheating caused by excessive use of a single battery and motor. With continuing reference to FIGS. 1 and 2, the process 300 may be implemented via one or more components of the vehicle 112 and the trailer 160. For instance, the process 300 may be individually or collectively implemented via the computing platform 150, the PCM 280, and/or the trailer controlling system 180. For simplicity purposes, the following description will be made with reference to the computing platform 150. At operation 302, responsive to detecting the vehicle 112 has been connected to the trailer 160, the computing platform 150 measures the SOC of both the traction battery 124 and the trailer battery 170 to determine a total amount of charge in the batteries combined. The capacity for the traction battery 124 and for the trailer battery 170 may be different and the SOC as measured from both batteries may be used as a reference to determine how much charge each battery currently has specifically. At operation 304, the computing platform 150 measures the weight of the vehicle 112 and trailer via one or more respective weight sensors 284, 286. At operation 306, the computing platform 150 plans a navigation route via the navigation controller 222. The route destination may be manually input to the computing platform 150 by a vehicle user via the HMI controls 212. Alternatively, the destination may be automatically generated by the computing platform 150 using vehicle data 226 such as a user calendar or the like. Alternatively, the destination may be received from the server 278 via the TCU 270.

At operation 308, the computing platform 150 determines a desired charge distribution between the traction battery 124 and the trailer battery 170 based on the total charge, the weight and the planned route. In general, it may be preferrable to distribute the charges between the traction battery 124 and the trailer battery 170 to allow a relatively even motor propulsion such that the heat generated by the respective motors and batteries are balanced. The desired charge distribution may vary depending on one or more of the above factors. For instance, responsive to a heavily loaded trailer, it may be desired to distribute more charge to the trailer battery 170 to use the trailer motor 164 more often for propulsion. At operation 310, the computing platform 150 verifies if one of the batteries currently has less than the respective desired charge. In general, having more than the desired charge is acceptable. What is undesired is one of the batteries having insufficient charge to propel the respective motor as planned. If the answer for operation 310 is yes indicative of both batteries having the sufficient charge, the process proceeds to operation 312 and there may be no need to balance the charge between the traction battery 124 and the trailer battery 170. Otherwise, if the answer is no indicative of a charge transfer being needed, the process proceeds to operation 314 and the computing platform 150 identifies the one of the batteries to be charged as a recipient and the other one of the batteries to donate the charge as a donor. The computing platform 150 further determines the amount of charge to be transferred from the donor to the recipient such that the recipient battery reaches the desired charge distribution. At operation 316, the computing platform 150 further verifies if the traction battery 124 and the trailer battery 170 are connected via the power cable 178. If the answer is yes, the process proceeds to operation 318 and the computing platform 150 coordinates the charge transfer via the cable 178 by transferring the calculated amount of the charge from the donor to the recipient. Otherwise, if the traction battery 124 and the trailer battery 170 are not electrically connected, the process proceeds to operation 320 and the computing platform 150 coordinates the charge transfer by instructing the vehicle 112 and the trailer 160 to propel primarily using the electric power from the donor, and to primarily generate the regenerative braking power to charge the recipient as the vehicle drives to balance the electric charge.

Figure 4:
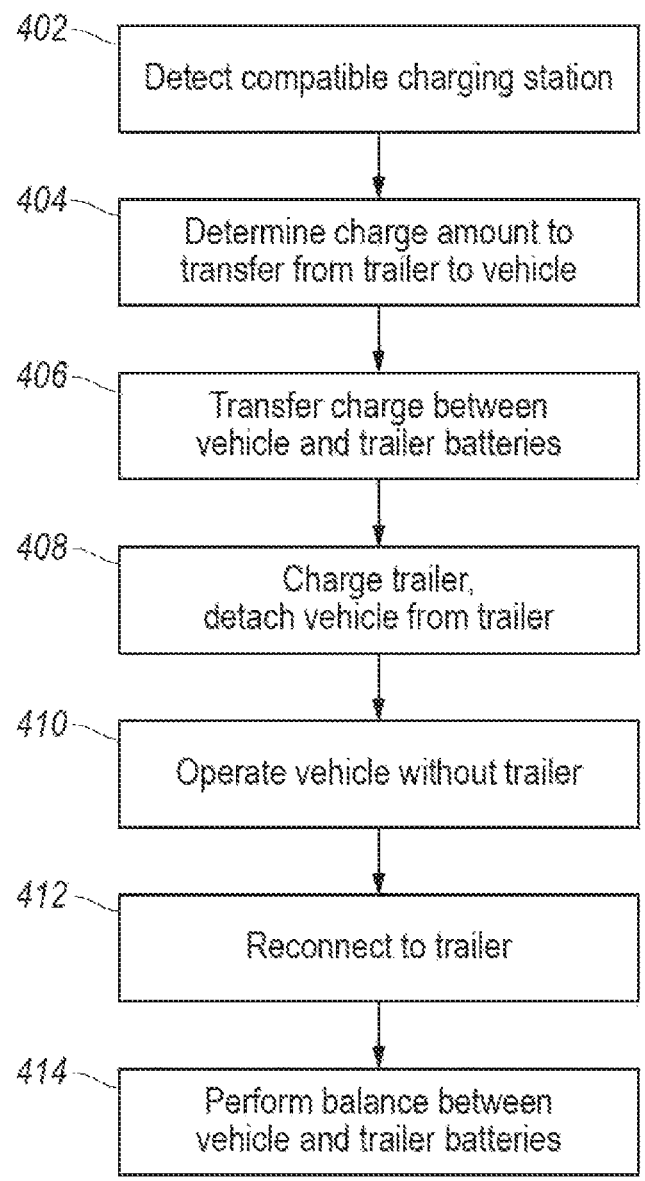
FIG. 4 is a flow diagram of a process for charging the trailer.

Referring to FIG. 4, an example flow diagram of a process 400 for charging the trailer 160 is illustrated. With continuing reference to FIGS. 1-3, responsive to detecting a compatible charging station/EVSE 136 for the trailer 160 at operation 402, the computing platform 150 determines an amount of charge to be transferred from the trailer battery 170 to the traction battery 124. In general, since the trailer may be charged at the EVSE 136, it may be desired to leave as little charge as possible at the trailer 160 when the vehicle 112 and the trailer 160 arrives at the EVSE 136. Therefore, at operation 404, the computing platform 150 may determine a desired charge distribution using the EVSE 136 as the destination similar to the operations 306 and 308 discussed with reference to FIG. 3, and calculate the amount of charge that may be transferred from the trailer battery 170 to the traction battery 124 before arriving at the destination. Alternatively, there may be situations when the current charge of the trailer 160 is insufficient to reach the destination. In these cases, the computing platform 150 may determine the amount of charge to be transferred from the vehicle 112 to the trailer 160. At operation 406, the computing platform 150 transfers the charge from the trailer battery 170 to the traction battery 124 while the vehicle is driving to the destination. At operation 408, once arrived at the EVSE 136, the vehicle 112 may be disconnected from the trailer leaving the trailer connected to the EVSE 136 alone. Since the extra charge has been transferred to the traction battery 124, at operation 410, the vehicle 112 may have more flexibility to drive elsewhere while waiting for the trailer 160 to be charged. At operation 412, once the vehicle 112 returns to the EVSE 136, the vehicle 112 may be reconnected to the trailer 412. In one example, the trailer 160 may send a message to the vehicle 112 via the wireless network 272 to inform the vehicle 112 that the charging process is complete (or about to complete). At operation 414, the computing platform 150 performs the charge balance process as illustrated with reference to FIG. 3 before reaching the next destination.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to strength, durability, life cycle, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
    an electric machine;
    a traction battery; and
    a controller programmed to command the electric machine to produce propulsive torque with energy from the traction battery and, at a same time, command an electric machine of a trailer coupled with the vehicle to produce regenerative torque such that a speed of the vehicle does not change.

2. The vehicle of claim 1, wherein the controller is programmed to generate the commands responsive to a state of charge of the traction battery being greater than a state of charge of a battery of the trailer.

3. The vehicle of claim 1, wherein the controller is programmed to further command the electric machine of the trailer to produce propulsive torque with energy from a battery of the trailer and, at a same time, further command the electric machine to produce regenerative torque such that the speed does not change.

4. The vehicle of claim 3, wherein the controller is programmed to generate the further commands responsive to a state of charge of the battery of the trailer being greater than a state of charge of the traction battery.

5. The vehicle of claim 1, wherein the controller is programmed to maintain the commands until a difference between a state of charge of the traction battery and a state of charge of a battery of the trailer is less than a predefined value.

6. The vehicle of claim 1, wherein the controller is programmed to selectively command the electric machine and the electric machine of the trailer to produce different amounts of propulsive torque based on temperature data associated with each of the electric machine and the electric machine of the trailer.

7. The vehicle of claim 1, wherein the traction battery and a battery of the trailer, configured to provide power to the electric machine of the trailer, lack a physical electrical connection therebetween.

8. A method comprising:
    responsive to a state of charge of a traction battery of a vehicle being less than a state of charge of a battery of a trailer coupled to the vehicle, commanding an electric machine of the trailer to provide propulsive torque with energy from the battery and, at a same time, commanding an electric machine of the vehicle to provide regenerative torque such that a speed of the vehicle remains same.

9. The method of claim 8 further comprising responsive to the state of charge of the traction battery being greater than the state of charge of the battery, commanding the electric machine of the trailer to provide regenerative torque and commanding the electric machine of the vehicle to provide propulsive torque such that the speed remains same.

10. The method of claim 8 further comprising maintaining the commands until the states of charge of the traction battery and the battery are same.

11. The method of claim 8 further comprising commanding the electric machine of the vehicle to produce more propulsive torque than the electric machine of the trailer responsive to data indicating a temperature of the electric machine of the trailer is closer to a limit value than a temperature of the electric machine of the vehicle.

12. The method of claim 8 further comprising commanding the electric machine of the trailer to produce more propulsive torque than the electric machine of the vehicle responsive to data indicating a temperature of the electric machine of the vehicle is closer to a limit value than a temperature of the electric machine of the trailer.

* * * * *